(12) United States Patent
Rebhan et al.

(10) Patent No.: US 7,685,803 B2
(45) Date of Patent: Mar. 30, 2010

(54) GAS TURBINE SYSTEM FOR INJECTING A MIXTURE OF HIGH VALUE HYDROCARBONS PLURAL DISTINCT FUELS INTO THE GAS TURBINE COMBUSTION CHAMBER

(75) Inventors: Dieter Rebhan, Albbruck (DE); Marcel Stalder, Klingnau (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 12/110,497

(22) Filed: Apr. 28, 2008

(65) Prior Publication Data

US 2008/0196385 A1 Aug. 21, 2008

Related U.S. Application Data

(62) Division of application No. 10/950,648, filed on Sep. 28, 2004, now Pat. No. 7,380,402.

(30) Foreign Application Priority Data

Sep. 29, 2003 (DE) ................... 103 45 566

(51) Int. Cl.
*F02C 3/20* (2006.01)
(52) U.S. Cl. .................. 60/39.463; 60/39.465
(58) Field of Classification Search ............. 60/39.463, 60/39.465, 776, 772
See application file for complete search history.

(56) References Cited

U.S. PATENT DOCUMENTS

| | | | |
|---|---|---|---|
| 4,025,282 A * | 5/1977 | Reed et al. ............... 431/11 |
| 4,253,301 A | 3/1981 | Vogt | |
| 4,761,948 A | 8/1988 | Sood et al. | |
| 4,833,878 A | 5/1989 | Sood et al. | |
| 5,081,844 A | 1/1992 | Keller et al. | |
| 5,408,825 A | 4/1995 | Foss et al. | |
| 5,454,220 A | 10/1995 | Althaus et al. | |
| 6,367,239 B1 * | 4/2002 | Brown et al. ............... 60/775 |
| 6,434,945 B1 | 8/2002 | Mandai et al. | |
| 6,438,963 B1 | 8/2002 | Traver et al. | |
| 6,490,867 B2 * | 12/2002 | Braun et al. ............... 60/776 |
| 6,640,548 B2 | 11/2003 | Brushwood et al. | |
| 6,694,745 B2 | 2/2004 | Stalder et al. | |
| 6,779,333 B2 * | 8/2004 | Gerhold .................... 60/39.53 |
| 7,310,951 B2 * | 12/2007 | Kasahara ................... 60/776 |
| 2001/0001171 A1 | 5/2001 | Onoda et al. | |
| 2002/0026786 A1 | 3/2002 | Nakamoto | |
| 2003/0056517 A1 | 3/2003 | Brushwood et al. | |
| 2003/0163994 A1 | 9/2003 | Kuramoto et al. | |
| 2003/0217555 A1 | 11/2003 | Gerhold | |
| 2006/0080966 A1 | 4/2006 | Widener | |

OTHER PUBLICATIONS

Foos, F., et al., "Development of the sequential combustion system for the GT24/GT26 gas turbine family," ABB Review, Apr. 1998, pp. 4-16, ABB, Baden, Switzerland.

* cited by examiner

*Primary Examiner*—William H Rodriguez
(74) *Attorney, Agent, or Firm*—Cermak Kenealy Vaidya & Nakajima LLP; Adam J. Cermak

(57) ABSTRACT

A gas turbine uses a first fuel at full load and an improved emission behavior is achieved by operating the gas turbine (11) at partial load with a second fuel, which has a richer mix of higher-value hydrocarbons (C2+) with 2 and more carbon atoms per molecule like ethane ($C_2H_6$) and propane ($C_3H_8$).

18 Claims, 3 Drawing Sheets

GAS TURBINE SYSTEM FOR INJECTING A MIXTURE OF HIGH VALUE HYDROCARBONS PLURAL DISTINCT FUELS INTO THE GAS TURBINE COMBUSTION CHAMBER

This application is a Divisional of, and claims priority under 35 U.S.C. §120 to, U.S. application Ser. No. 10/950,648, filed 28 Sep. 2004 now U.S. Pat. No. 7,380,402, allowed, and claims priority under 35 U.S.C. §119 to German application number 103 45 566.3, filed 29 Sep. 2003, the entireties of which are incorporated by reference herein.

BACKGROUND OF THE INVENTION

1. Field of Endeavor

The present invention relates to the technical field of gas turbines. It concerns a method for operating a gas turbine, as well as a gas turbine system for carrying out the method.

2. Brief Description of the Related Art

Usually burners such as the so-called EV burner (double cone burner, ref., for example, U.S. Pat. No. 5,081,844) and the so-called SEV burner (secondary EV burner, ref., for example, an article by F. Joos et al. Development of the sequential combustion system for the GT24/GT26 gas turbine family, ABB Review 4, p. 4-16 (1998) or U.S. Pat. No. 5,454,220) used in gas turbines are designed for full load operation. Nonetheless it might be necessary to operate the gas turbine at partial load. This might be because the network cannot absorb the generated energy or the gas turbine is started up or shut down (repairs, etc.). If no special measures are taken, partial load operation results in an unfavorable emission behavior with regard to CO and NOx. Another problem with partial load operation of a gas turbine concerns the residue of the relatively cool exhaust gas in relatively short combustion chambers. Cold gases and short dwell times result in low NOx emissions, but unfortunately also in increased CO/UHC emissions.

Publication U.S. Pat. No. 5,081,844 mentioned in the introduction proposes addressing the issue of emissions with partial loads by alternating the arrangement of small and large premix burners and having the small premix burners function as pilot burners. Publication U.S. Pat. No. 5,454,220 mentioned in the introduction proposes this procedure for gas turbines with SEV burners.

The disadvantage with this kind of emissions optimization for partial load operation is the fact that the burners in the main combustion chamber must be specially configured in order to allow for the corresponding operation. This procedure is difficult to realize in retrospect in existing gas turbines without any special burner arrangement, and thus it is difficult to eliminate emissions issues during partial load operation.

SUMMARY

One of numerous aspects of the present invention therefore includes providing a method for operating a gas turbine that results in a material improvement of the emission behavior during partial load operation without any structural changes to the gas turbine itself, as well as to provide a gas turbine system for carrying out the method.

A principle of the invention is that the gas turbine that uses a first fuel at full load uses a second fuel at partial load to improve the emission behavior, with the second fuel having a richer mix of higher-value hydrocarbons (C2+) with 2 or more carbon atoms per molecule like ethane ($C_2H_6$) and propane ($C_3H_8$) compared to the first fuel (the higher-value carbons are hereinafter referred to as C2+).

In an exemplary manner gaseous fuels are used as a first and second fuel.

As a rule it is possible to use two separate gas sources for providing the first and the second fuel with the gas sources having different gas composition with regard to the higher-value hydrocarbons (C2+), whereby the two fuels are taken directly from the gas sources so that there is a switch between the gas source with the lower share of higher-value hydrocarbons (C2+) and the gas source with the higher share of high-value gas carbons (C2+) when there is a switch from full to partial load. As an alternative it is possible to generate the two fuels based on a different mixture of the gases in the two gas sources.

An alternative is to produce the first fuel from the second fuel by separating higher-value hydrocarbons (C2+). Especially favorable is a method in which the separated, higher-value hydrocarbons (C2+) are placed in intermediate storage and are added to the second fuel during partial load operation. Due to space issues it might be beneficial to liquefy the separated, higher-value hydrocarbons (C2+) prior to intermediate storage, to intermediately store them as a liquid gas and to evaporate them prior to adding.

Another alternative is characterized in that the second fuel is produced from the first fuel by adding higher-value hydrocarbons (C2+). The added, higher-value hydrocarbons can be taken from a local reservoir that is either a liquid gas storage tank, whereby the liquid gas taken from the liquid gas storage tank is evaporated in an evaporator prior to adding, or is a gas reservoir.

Furthermore it is possible to generate the first and second fuel based on a third fuel whose content of higher-value hydrocarbons (C2+) ranges between the first and the second fuel. The first and second fuel is generated from the third fuel by separating and adding higher-value hydrocarbons (C2+). The higher-value hydrocarbons (C2+) that are separated from the third fuel when generating the first fuel are, in an exemplary embodiment, placed in intermediate storage, are taken from storage when generating the second fuel and are added to the third fuel. Due to spatial restrictions it might again be beneficial to liquefy the separated, higher-value hydrocarbons (C2+) prior to placing them in intermediate storage, to store them as a liquid gas and to evaporate them prior to adding.

Exemplarily, the share of higher-value hydrocarbons (C2+) for the second fuel is approximately 10% to 30% higher than in the first fuel.

An exemplary embodiment of the gas turbine facility in accordance with the principles of the present invention is characterized in that the means for a controlled change of the composition of the fuel flowing through the main fuel feeding line comprise an auxiliary fuel feeding line that discharges into the main fuel feeding line, and that is connected to a reservoir that contains higher-value hydrocarbons (C2+). A controllable valve is arranged in the auxiliary fuel feeding line for controlling the gas stream that flows through the auxiliary fuel feeding line.

The reservoir that contains the higher-value hydrocarbons (C2+) can be a gas reservoir. It can also be a liquid gas reservoir, whereby an evaporator is arranged in the auxiliary fuel feeding line.

Another exemplary embodiment according to principles of the present invention includes a gas separating mechanism arranged in the main fuel feeding line that separates higher-value hydrocarbons (C2+) from the gas that flows through the main fuel feeding line and provides them to the reservoir that contains higher-value hydrocarbons (C2+). Much space is saved when the reservoir containing the higher-value hydrocarbons (C2+) is a liquid gas reservoir, and a gas liquefying mechanism is arranged between the gas separating mechanism and the liquid gas reservoir.

BRIEF DESCRIPTION OF THE DRAWINGS

The invention is explained in more detail based on the exemplary embodiments in connection with the drawing. The figures show the following.

DETAILED DESCRIPTION OF EXEMPLARY EMBODIMENTS

One principle of the present invention recognizes the fact that the emission behavior of a gas turbine can be positively influenced by adding $C_2H_6$ and higher molecular hydrocarbons (C2+). It is specifically CO emissions that can be kept below the required emission values across a much larger partial load range than is currently possible. Furthermore, this also has a positive influence on the extinguishing limit, which in turn results in lower NOx emissions.

Figure 1:
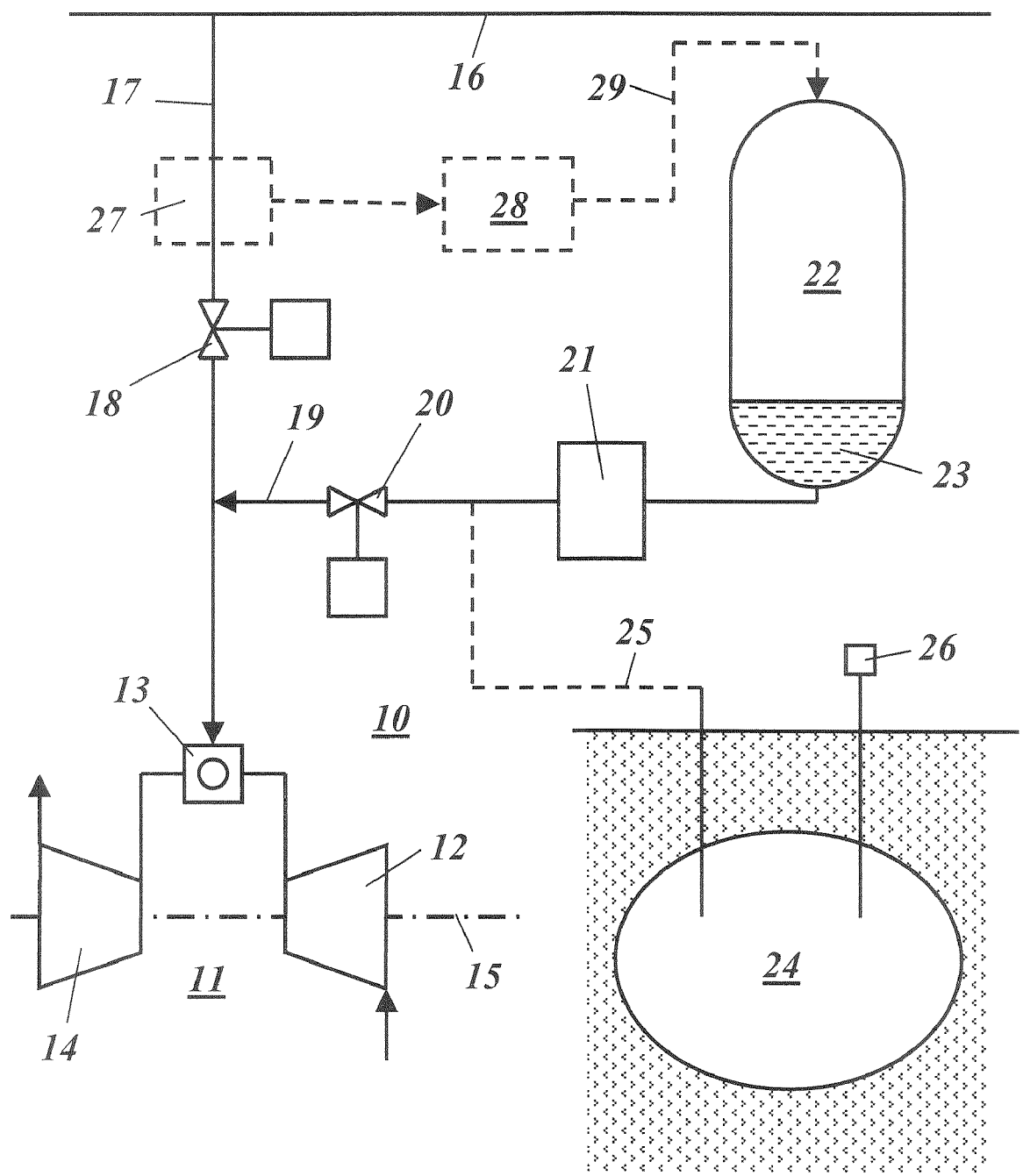
FIG. 1 shows a simplified scheme of a first exemplary embodiment of a gas turbine system in accordance with the invention that can be used to carry out the method in accordance with the invention.

A suitable gas turbine system is shown in a simplified scheme in FIG. 1. The gas turbine system 10 comprises a gas turbine 11 that is comprised, as is customary, of a compressor 12, a combustion chamber and a turbine 14. Compressor 12 and turbine 14 are arranged on a mutual shaft 15 that is used to drive a generator, not shown in FIG. 1, for power generation purposes. During operation the compressor 12 intakes the air, compresses it and feeds it into the combustion chamber 13, where it is mixed with a, for example, gaseous fuel, and the fuel is combusted. The hot combustion gases from the combustion chamber are expanded in the turbine with thermodynamic performance and then are reused (e.g., in Heat Recovery Steam Generator, HRSG) or are released to the outside. The fuel required in the combustion chamber 13 is taken from a fuel line 16 (e.g., a natural gas pipeline) and is supplied to the combustion chamber 13 via a main fuel feeding line 17. The supply can be controlled using a first controllable valve 18.

An auxiliary fuel feeding line 19 discharges into the main fuel feeding line 17. It is connected to a liquid gas storage tank 22 via a second controllable valve 20 and an evaporator 21. The liquid gas storage tank 22 contains liquid gas 23 in the form of liquefied, higher-value hydrocarbons (C2+). The liquid gas storage tank 22 can either be filled from the outside or—as is indicated by the dash-doted line in FIG. 1—can be connected to a gas separating mechanism 27 via a gas liquefying mechanism 28. The gas separating mechanism 27 is arranged in the main fuel feeding line 17, and its design is such that it can withdraw a set amount of the higher-value hydrocarbons (C2+) from the gaseous fuel that flows through the main fuel feeding line 17.

As an alternative to the liquid gas storage tank 22 it is possible to use a (e.g., underground) gas reservoir 24 as a reservoir for higher-value hydrocarbons. It can be filled via a filling port 26 and a liquid gas tanker, for example, with subsequent evaporation.

The operation of the gas turbine system 10 can be described as follows: The gas turbine 11 is started with the customarily available, usually gaseous fuel from the fuel feeding line and is connected to the network using the so-called pilot operation. As soon as the gas turbine 11 is coupled to the network and provides increasing power to the network, higher-value hydrocarbons (ethane $C_2H_6$, propane $C_3H_8$, etc.) are added to the fuel. This additive of so-called C2+ gas (with 2 and more C-atoms) is guided from the liquid gas storage tank 22 via the evaporator 21 and is added to the main fuel. A C2+ gas share of approximately 10 to 30% is added in a controlled manner. As an alternative it is possible to add the C2+ gas from the gas reservoir 24 to the fuel in a controlled manner.

If a flame temperature is reached that is accordingly high, operation is switched to the so-called premix operation. The so-called switching temperature at which operation can be switched to the premix operation strongly depends on the (C2+) gas content at which the gas turbine 11 is operated. The higher the (C2+) gas content, the lower the switching temperature can be set. The advantage of this operating procedure is that the load range with premix operation and thus with low NOx emission can be increased significantly by adding (C2+) gas. The result is that the operation of the gas turbine 11 significantly reduces the entire NOx emissions.

As already mentioned in the introduction, another issue with partial load operation of a gas turbine is the burn out of the relatively cool exhaust gases in relatively short combustion chambers. Cold gases and short dwell times result in low NOx emissions, but unfortunately also in increased CO/UHC emissions (UHC=Unburned Hydro Carbons).

Here, too, it is found that adding (C2+) gas to the fuel results in a faster burn out of the exhaust gases. Despite relatively short combustion chambers with correspondingly short dwell times, the toxic carbon monoxide is reduced to nontoxic $CO_2$ over a considerably larger partial load range.

With increasing load the combustion temperatures approach full load operating temperatures. The combustion chamber 13 that is designed for full load operation now has sufficiently high temperatures, and the burnout from CO to $CO_2$ occurs in a period of time that is shorter than the dwell time of the exhaust gases in the combustion chamber 13. The (C2+) gas content in the fuel can be accordingly reduced with increasing load until no more (C2+) gas from the liquid gas storage tank 22 or the gas reservoir 24 must be added.

The filling of a liquid gas storage tank 22 is the easiest. Customary infrastructure for filling liquid gas storage tanks is known and does not require any additional explanation at this point (supply of liquid gas with tanker/truck etc.). A gas reservoir 24 can be supplied with liquid gas as well. Before charging the gas reservoir 24 via the filling port 26, the liquid gas is returned to the gaseous state using an evaporator.

However, a different method is also feasible for a gas turbine system 10 according to FIG. 1: Natural gas as main fuel for gas turbines may have different compositions depending on the location where the natural gas is produced. Each gas displays a different combustion behavior that is based on its origin and composition. Not all "gas types" combust equally. However, there are regulations that require that emissions be within tight limits across the largest possible operating ranges.

This requirement cannot be met if different gases are combusted in the same manner. On the other hand it is possible to optimally design and operate the combustion system for a specifically defined gas. However, the gas to be combusted must correspond to the respective definition used for the design. This can be achieved by separating the fuel gas. To this end, a gas separating mechanism 27 (dashed line in FIG. 1) is integrated in the main fuel feeding line 17 to the gas turbine 11. It ensures that a fuel gas that meets the specification is added to the gas turbine 11. Any excess of (C2+) gas is withdrawn from the gas when the gas turbine 11 is operated at full load. The excess is liquefied in a gas liquefying mechanism 28 and is placed in intermediate storage in the liquid gas storage tank 22 via a filling line 29 until the gas turbine 11 is/must be operated in the partial load operation, and a lack of (C2+) must be offset instead of a surplus of (C2+). The withdrawn gas can also be sent to a suitable underground gas reservoir 24 via a feeding line 25. The gas reservoir 24 or liquid gas storage tank 22 is unloaded during the corresponding partial load operation. The size of the intermediate reservoir 22, 24 must be chosen based on the anticipated partial load and full load hours and the gas composition, If different gas sources with different gas compositions are used for operating the gas turbine, it is furthermore possible to use smaller intermediate storage (liquid gas storage tank or gas reservoir). During partial load operation the gas turbine is operated with the (C2+) richer fuel gas with empty intermediate storage, and at full load (or correspondingly high partial load) operation is switched to the (C2+) poorer gas source, or the gas turbine is operated with the C2+ rich gas during full load and excess (C2+) gas is separated via a gas separating mechanism again and stored in intermediate storage. When operating with two gas sources, it might be advantageous from time to time to mix the two gases at a certain ratio and to add the mixture to the gas turbine according to the (C2+) content that is required at the time and in order to be able to optimally operate the respective operating point (low CO and low NOx emissions).

Figure 2:
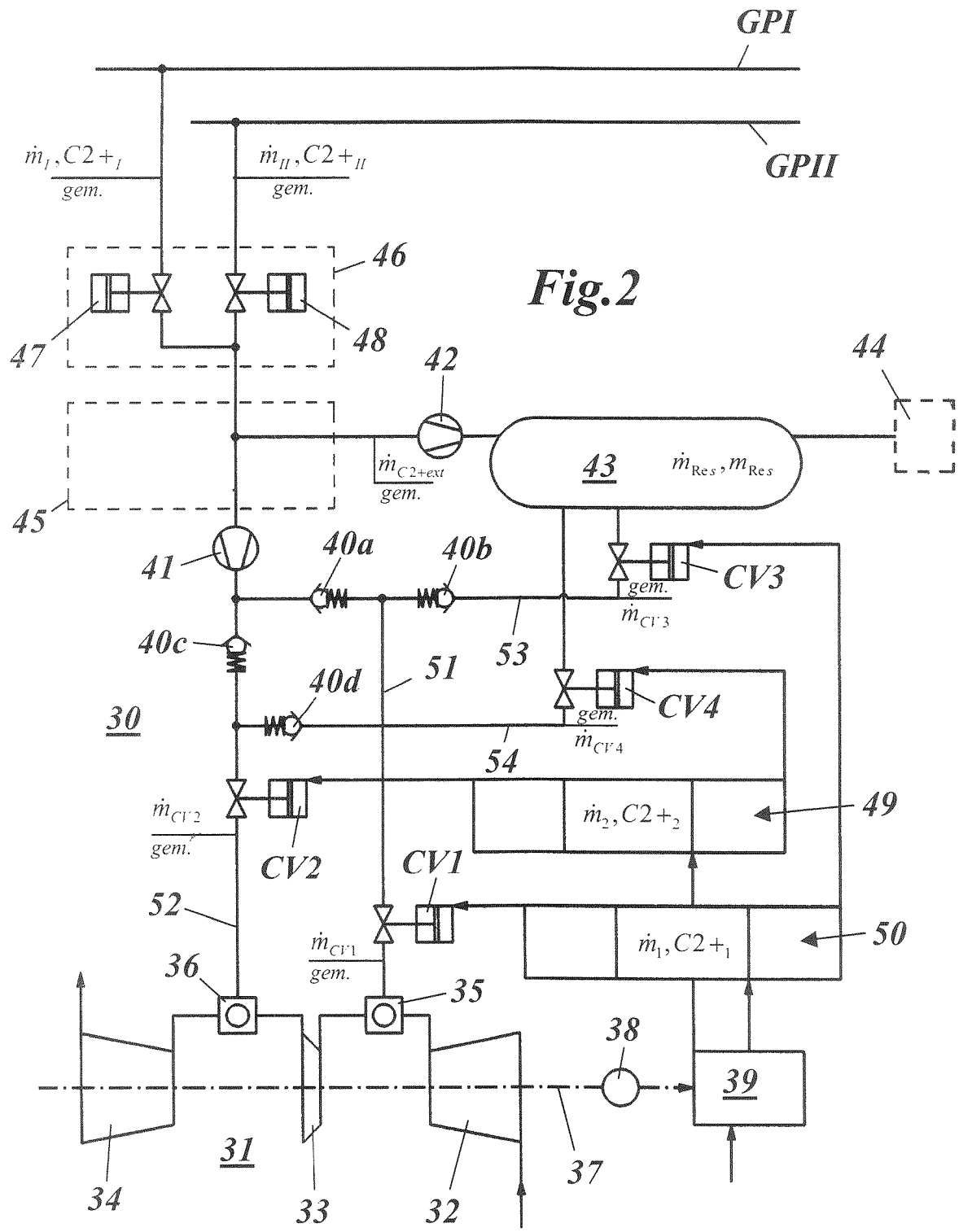
FIG. 2 shows a simplified scheme of a second exemplary embodiment of a gas turbine system in accordance with the invention with the respective load-based control that can be used to carry out the method in accordance with the invention.

An example of a gas turbine system that works with two gas sources is shown in FIG. 2. The gas turbine system 30 of FIG. 2 comprises a gas turbine 31 with a compressor 32, two combustion chambers 35 and 36, a first turbine 33 arranged between them and a second turbine 34. The turbines 33, 34 and the compressor 32 are arranged on a mutual shaft 37 that drives a generator 38. The configuration corresponds to the one shown in U.S. Pat. No. 5,454,220. The combustion chambers 35, 36 are supplied with gaseous fuels via a main fuel feeding line 51, 52 from two gas sources in the form of two gas pipelines GPI and GPII. It is possible to produce a predefined mixture of both fuels in a preceding mixing device 46 with two control valves 47, 48, or it is possible to switch to a different fuel. (C2+) shares can be separated in a subsequent gas separating mechanism 45 and can be placed in a reservoir 43 via a compressor 42. The separated fuel is compressed in a compressor 41 and guided to the combustion chambers 35, 36 via the two main fuel feeding lines 51, 52. On each of the two main fuel feeding lines 51, 52 it is possible to add higher-value hydrocarbons (C2+) from the reservoir 43 via an auxiliary fuel feeding line 53, 54 and a system of nonreturn valves 40a, . . . ,d and control valves CV3, CV4. The fuel mass flow rate in the respective main fuel feeding line 51, 52 can be controlled with a control valve CV1 and/or CV2. The reservoir 43 can also be filled externally from a filling station 44.

Figure 3:
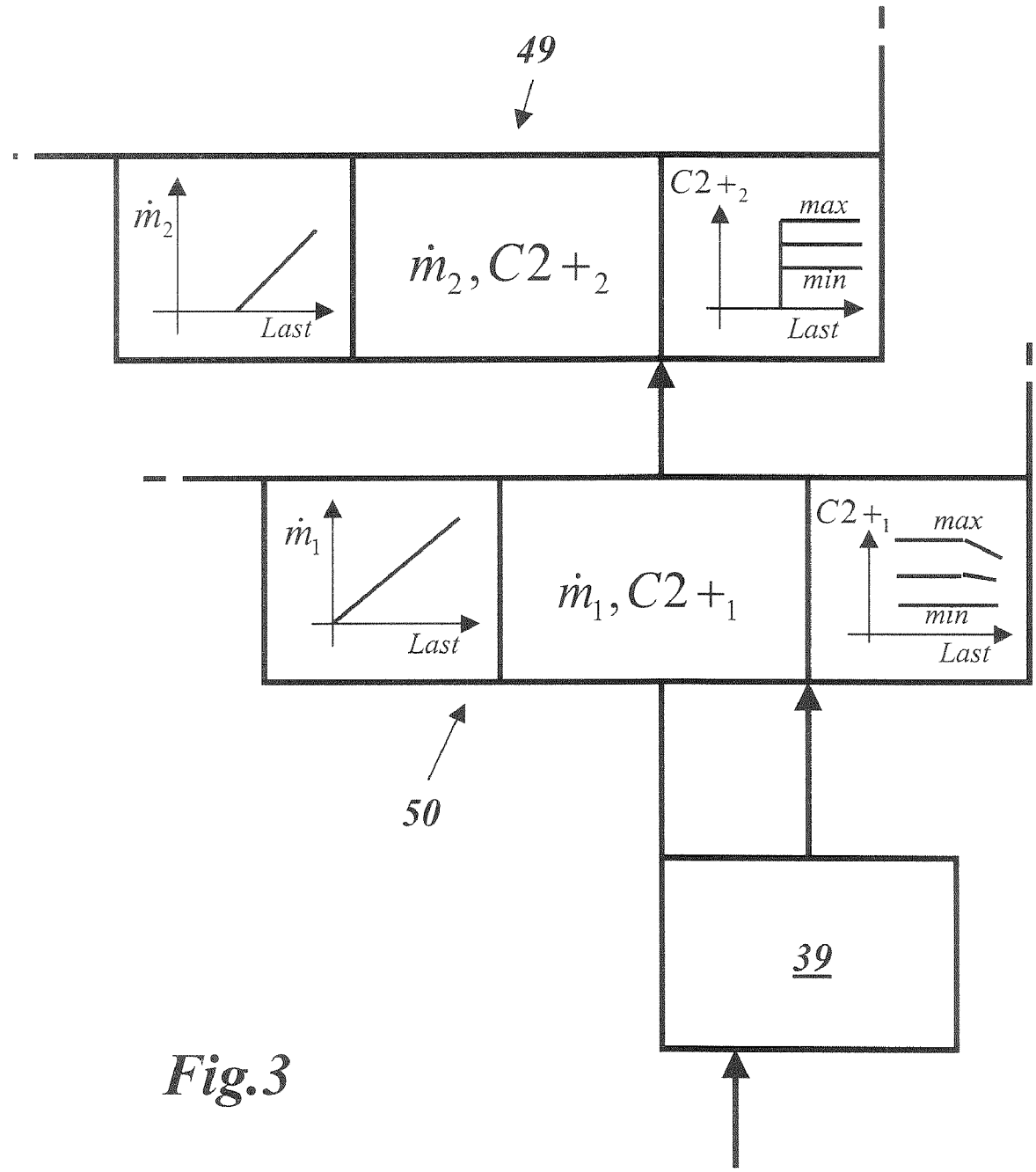
FIG. 3 shows an enlarged section of the control blocks of the load-based control shown in FIG. 2.

The various fuel mass flow rates indicated in FIG. 2 and measured at the respective locations ($\dot{m}_x$, x=I,II,1,2, CV1, . . . ,CV4;C2+ ext,Res) are controlled with a load controller 39 via two control devices 49, 50 based on the power or load required from the network, with the devices on one hand controlling the entire fuel mass flow rate per combustion chamber 35, 36 via control valves CV1 and CV2, and on the other hand controlling the adding of (C2+) shares to the fuel via control valves CV3 and CV4. The respective exemplary control curves are indicated in the enlarged presentation of the control devices 49, 50 in FIG. 3. The following applies:

$$\dot{m}_{CV1}=f(\text{load})$$

$$\dot{m}_{CV2}=f(\text{load})$$

$$\dot{m}_I+\dot{m}_{II}-\dot{m}_{C2+ext}=\dot{m}_{CV1}+\dot{m}_{CV2}$$

$$\dot{m}_{Res}=\dot{m}_{C2+ext}-\dot{m}_{CV3}-\dot{m}_{CV4}$$

$$m_{Res}=\int \dot{m}_{Res} \cdot dt.$$

LIST OF REFERENCE NUMERALS

10,30 gas turbine system
11,31 gas turbine
12,32 compressor
13,35,36 combustion chamber
14,33,34 turbine
15,37 shaft
16 fuel line
17,51,52 main fuel feeding line
18,20 valve
19,53,54 auxiliary fuel feeding line
21 evaporator
22 liquid gas storage tank
23 liquid gas
24 gas reservoir
25 feeding line
26 filling port
27,45 gas separating mechanism
28 gas liquefying mechanism
29 filling line
38 generator
39 load controller
40a, . . . ,d nonreturn valve
41,42 compressor
43 reservoir
44 filling station
46 mixing device
47,48 control valve
49,50 control device
CV1, . . . ,CV4 control valve
GPI,GPII gas pipeline While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A gas turbine system useful with a first fuel at full load and a second fuel to achieve an improved emission behavior, with the second fuel having a richer mix of higher-value hydrocarbons with 2 or more carbon atoms per molecule than said first fuel, the system comprising:
   a gas turbine having a compressor, at least one combustion chamber, and at least one turbine;
   at least one fuel source;
   a main fuel feeding line fluidly communicating the at least one fuel source to at least one of said at least one combustion chamber;
   means for controlling change of the composition of the fuel flowing though the main fuel feeding line;
   a reservoir containing higher-value hydrocarbons;

wherein the means for controlling comprises an auxiliary fuel feeding line configured and arranged to discharge into the main fuel feeding line, the auxiliary fuel feeding line being fluidly connected to the reservoir;

wherein the higher-value hydrocarbon containing reservoir comprises a liquid gas storage tank; and an evaporator arranged in the auxiliary fuel feeding line.

2. A gas turbine system according to claim 1, further comprising:

a controllable valve arranged in the auxiliary fuel feeding line configured and arranged to set a gas stream that flows though the auxiliary fuel feeding line.

3. A gas turbine system according to claim 1, wherein the higher-value hydrocarbon containing reservoir comprises a gas reservoir.

4. A gas turbine system according to claim 1, wherein the higher-value hydrocarbons comprises a fuel selected from the group consisting of ethane ($C_2H_6$) and propane ($C_3H_8$).

5. A gas turbine system useful with a first fuel at full load and a second fuel to achieve an improved emission behavior, with the second fuel having a richer mix of higher-value hydrocarbons with 2 or more carbon atoms per molecule than said first fuel, the system comprising:

a gas turbine having a compressor, at least one combustion chamber, and at least one turbine;

at least one fuel source;

a main fuel feeding line fluidly communicating the at least one fuel source to at least one of said at least one combustion chamber;

means for controlling change of the composition of the fuel flowing though the main fuel feeding line;

a reservoir containing higher-value hydrocarbons;

wherein the means for controlling comprises an auxiliary fuel feeding line configured and arranged to discharge into the main fuel feeding line, the auxiliary fuel feeding line being fluidly connected to the reservoir; and a gas separating mechanism arranged in the main fuel feeding line configured and arranged to separate high-value hydrocarbons from a gas when flowing though the main fuel feeding line and to supply said high-value hydrocarbons to the higher-value hydrocarbon containing reservoir.

6. A gas turbine system according to claim 5, wherein the higher-value hydrocarbon containing reservoir comprises a liquid gas storage tank, and further comprising:

a gas liquefying mechanism arranged between the gas separating mechanism and the liquid gas storage tank.

7. A gas turbine system according to claim 5, further comprising:

a controllable valve arranged in the auxiliary fuel feeding line configured and arranged to set a gas stream that flows though the auxiliary fuel feeding line.

8. A gas turbine system according to claim 5, wherein the higher-value hydrocarbon containing reservoir comprises a gas reservoir.

9. A gas turbine system according to claim 5, wherein the higher-value hydrocarbons comprises a fuel selected from the group consisting of ethane ($C_2H_6$) and propane ($C_3H_8$).

10. A gas turbine system useful with a first fuel at full load and a second fuel to achieve an improved emission behavior, with the second fuel having a richer mix of higher-value hydrocarbons with 2 or more carbon atoms per molecule than said first fuel, the system comprising:

a gas turbine having a compressor, at least one combustion chamber, and at least one turbine;

at least one fuel source;

a main fuel feeding line fluidly communicating the at least one fuel source to at least one of said at least one combustion chamber;

means for controlling change of the composition of the fuel flowing though the main fuel feeding line;

a reservoir containing higher-value hydrocarbons;

wherein the means for controlling comprises an auxiliary fuel feeding line configured and arranged to discharge into the main fuel feeding line, the auxiliary fuel feeding line being fluidly connected to the reservoir; and a load controller configured and arranged, based on the required gas turbine performance, to control the change of the composition of the fuel that flows though the main fuel feeding line.

11. A gas turbine system according to claim 10, further comprising:

a controllable valve arranged in the auxiliary fuel feeding line configured and arranged to set a gas stream that flows through the auxiliary fuel feeding line.

12. A gas turbine system according to claim 10, wherein the higher-value hydrocarbon containing reservoir comprises a gas reservoir.

13. A gas turbine system according to claim 10, wherein the higher-value hydrocarbons comprises a fuel selected from the group consisting of ethane ($C_2H_6$) and propane ($C_3H_8$).

14. A gas turbine system useful with a first fuel at full load and a second fuel to achieve an improved emission behavior, with the second fuel having a richer mix of higher-value hydrocarbons with 2 or more carbon atoms per molecule than said first fuel, the system comprising:

a gas turbine having a compressor, at least one combustion chamber, and at least one turbine;

at least one fuel source;

a main fuel feeding line fluidly communicating the at least one fuel source to at least one of said at least one combustion chamber;

means for controlling change of the composition of the fuel flowing though the main fuel feeding line;

a reservoir containing higher-value hydrocarbons;

wherein the means for controlling comprises an auxiliary fuel feeding line configured and arranged to discharge into the main fuel feeding line, the auxiliary fuel feeding line being fluidly connected to the reservoir; and means for selectively connecting the main fuel feeding line to two fuel sources with different contents of higher-value hydrocarbons.

15. A gas turbine system according to claim 14, wherein said means for selectively connecting comprises a mixing device. set a gas stream that flows though the auxiliary fuel feeding line.

16. A gas turbine system according to claim 14, further comprising:

a controllable valve arranged in the auxiliary fuel feeding line configured and arranged to set a gas stream that flows though the auxiliary fuel feeding line.

17. A gas turbine system according to claim 14, wherein the higher-value hydrocarbon containing reservoir comprises a gas reservoir.

18. A gas turbine system according to claim 14, wherein the higher-value hydrocarbons comprises a fuel selected from the group consisting of ethane ($C_2H_6$) and propane ($C_3H_8$).

* * * * *